Jan. 30, 1951  C. H. KIRK, JR  2,539,783
RING PIPE HANGER
Filed May 11, 1948
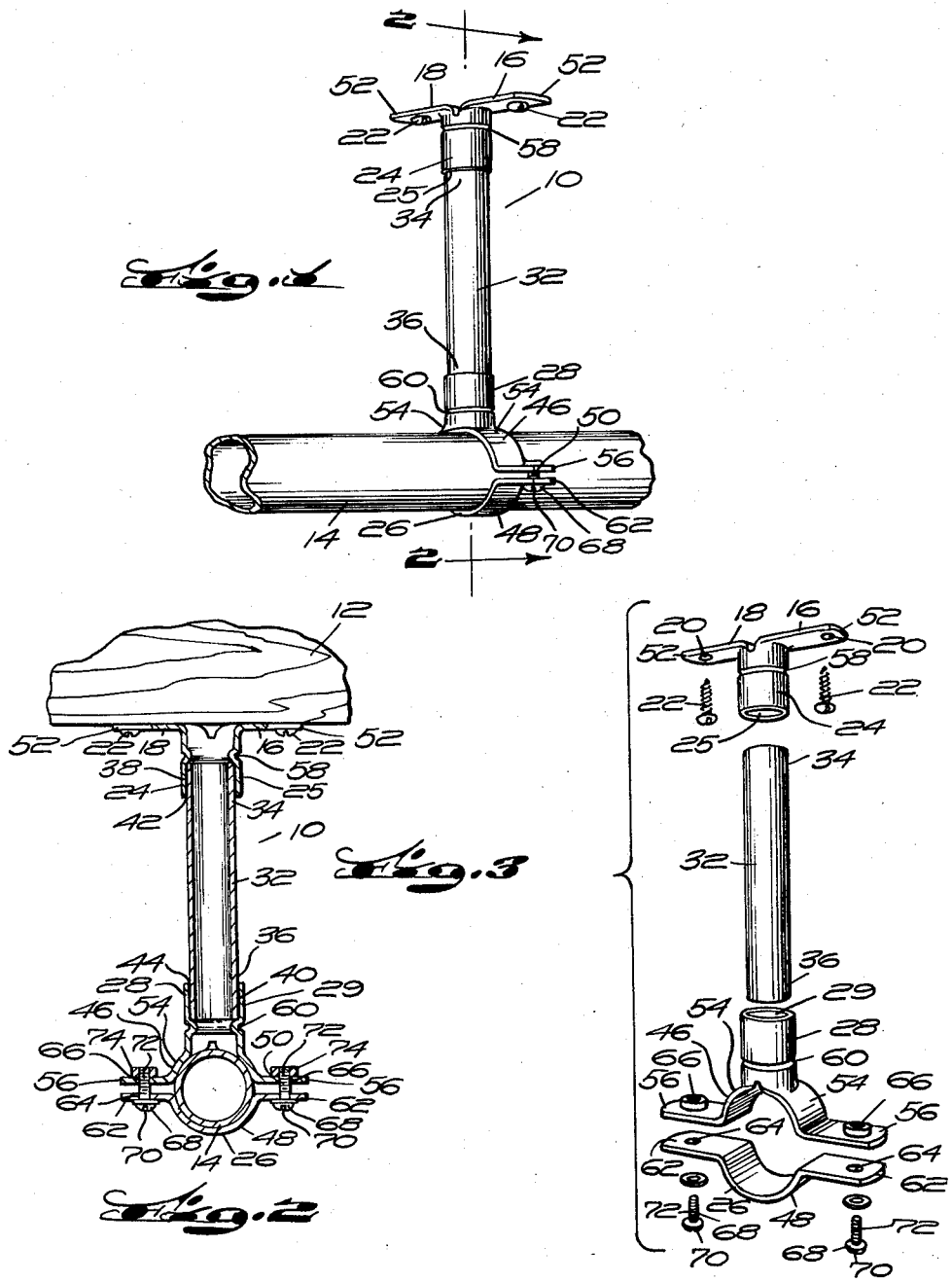
INVENTOR.
Chester H. Kirk, Jr.
BY
Thomas A. Jenckes
Attorney

Patented Jan. 30, 1951

2,539,783

UNITED STATES PATENT OFFICE 2,539,783

RING PIPE HANGER

Chester H. Kirk, Jr., Cranston, R. I., assignor to American Tube Products, Incorporated, Natick, R. I., a corporation of Rhode Island Application May 11, 1948, Serial No. 26,250

1 Claim. (Cl. 248—62)

My invention relates to improvements in ring pipe hangers of the type having a base adapted to be secured to the ceiling or other foundation, having a socket depending therefrom and a solid or split ring adapted to contain the pipe to be supported, also having a socket projecting upwardly therefrom. In the prior art both of these sockets have been threaded and the height of the hanger has been regulated by the length of an externally threaded rod having its upper and lower ends respectively threaded in each of these sockets. While rods have been provided which may be cut the desired length on the job, it is obvious that this type of hanger has been subject to various disadvantages. It requires some time to saw through the solid rod and also to thread the respective ends of the threaded rod into the respective threaded sockets. The sockets have tended to unscrew on vibration and depending threaded rods have presented an unsightly appearance and due to their roughened surface have tended to accumulate dust, lint and other substances thereon to be unsightly soon after they are installed. Objects of my invention are to overcome these disadvantages of the prior art threaded rod ring hangers.

Employing my invention, I use a length of tubing having an outer periphery of slightly less size than the smooth inner peripheries of the respective sockets. The tubing may be supplied in long lengths and very quickly cut on the job to the desired length, much more quickly than it is possible to saw a solid rod, and the ends of the tubing may be then inserted in the sockets and very quickly soldered therein.

An object of my invention, therefore, is to provide a soldered ring hanger which may be more quickly assembled on the job than prior types.

A further object of my invention is to provide a device which is not only constructed of cheaper parts, requiring less machining operations for their manufacture, but due to the saving in time of assembly, costs less to install than former types.

A further object of my invention is to provide a ring hanger which is much neater in appearance than prior threaded types and which, as all parts thereof have smooth exposed surfaces, will present surfaces incapable of collecting dust and lint, as in former types.

A further object of my invention is to provide sockets having means such as indentations projecting internally thereof to limit the amount that the ends of the tubing may be inserted therein.

These and such other objects of my invention as may hereinafter appear will be best understood from a description of an embodiment thereof such as is shown in the accompanying drawings.

In the drawings,

Fig. 1 is a perspective view of a ring pipe hanger constructed in accordance with my invention, supporting a piece of pipe or tubing in use.

Fig. 2 is a vertical sectional view taken along the line 2—2 of Fig. 1.

Fig. 3 is a disassembled perspective view of the parts of my improved hanger.

In the drawings, wherein like characters of reference generally indicate like parts throughout, 10 generally indicates a ring pipe hanger constructed in accordance with my invention adapted to depend vertically from a ceiling 12 or in any desired fashion from any other object to support on its lower end a horizontal or other run of pipe or copper tubing 14, as shown. For this purpose, my invention includes a base 16 having a base plate 18 having suitable holes 20 to receive the screws 22 or other means for attachment thereof to the ceiling or other foundation and a cylindrical socket 24 having a smooth internal periphery 25 depending preferably centrally of said base plate. I also provide a ring 26 which may be split, as shown, or not, adapted to surround the pipe 14 to be supported, also having a cylindrical socket 28 projecting upwardly from the top thereof, having a smooth internal periphery 29 of substantially that of the base socket and I provide the tubing 32 of a length proportionate to the desired height of the pipe or tubing 14 of a circumference slightly less than that of the internal peripheries 25 and 29 of the upper and lower respective sockets 24 and 28, having its upper end 34 inserted within said upper socket 24 and its lower end 36 inserted within said lower socket 28 and I provide the solder 38 and 40 contained in the respective socket wells 42 and 44 between the inner peripheries 25 and 29 of said sockets and the outer peripheries of said tubing ends 34 and 36 to rigidly secure said tubing to said sockets. If desired, the ring 26 may be split into an upper hemi-cylindrical portion 46 and a lower hemi-cylindrical portion 48 provided with suitable means 50 to clamp said portions together around said pipe 14.

In the specific embodiment shown, the base plate 18, with its attached socket 24, may be constructed out of a piece of tubing split diametrically at one end thereof for a portion of its length and bent laterally into the outwardly flaring portions or plate-like anchoring members 52 extending laterally at diametrically opposite positions of said base and the upper hemi-cylindrical portion 46 of the ring may be similarly split diametrically from a piece of tubing for a portion of its length and bent laterally outwardly to have its walls 54 project diametrically therefrom in arcuate hemi-cylindrical formation and terminate in the outwardly projecting upper lips or plate-like anchoring members 56. If desired, each socket 24 and 28 may be provided with suitable means 58 and 60 respectively projecting inwardly of the inner periphery thereof adjacent the base thereof to limit insertion of the tubing ends 34 and 36 therein. While any suitable means, such as spaced lugs, may be provided for this purpose, in the preferred embodiment shown said means compromises the radially inwardly projecting annular ring 58 crimped in in the upper socket 24 adjacent the base thereof and the similar inwardly projecting annular ring 60 crimped in in the lower socket 28 adjacent the respective base thereof which additionally function to provide bases for the solder wells 42 and 44.

As stated, the pipe holding ring 26 may be split into the lower hemi-cylindrical portion 48 and upper hemi-cylindrical portion 46. The lower hemi-cylindrical portion 48 is also provided with the diametric lips or plate-like members 62 projecting radially outwardly from each end thereof, having vertical holes 64 therein.

As stated, the upper hemi-cylindrical portion comprises the arcuate portions 54 having the lips or plate-like members 56 projecting outwardly from each end thereof, said lips having the vertical threaded holes 66 therein.

As the means 50, to clamp the lower hemi-cylindrical portion 48 to the upper hemi-cylindrical portion 46, I employ the screws 68 having the slotted heads 70 and the threaded stems 72 projecting upwardly through the smooth holes 64 in the lower lips 62 and into the threaded holes 66 in the upper lips 56. If desired, the nuts 74 may be threaded onto the upper ends of said screws to clamp the lips or plate-like members 56 and 62 together to clamp the hemi-cylindrical portions 46 and 48 firmly around the pipe 14 to be supported.

In use, the plate 16 is secured to the ceiling or other means by means of the screws 22. The ring 26 is then secured over the pipe 14 and brought into position so that its socket 28 will vertically underlie the base socket 24. The tubing section 32 of a length proportionate to the desired height of the pipe may then be cut off on the job from a greater length of tubing and have its respective ends 34 and 36 inserted in the respective sockets 24 and 28. Solder may then be applied to the respective lower and upper ends of said sockets, so that it may fill up the respective wells 42 and 44 and solidify into the solid solder layers 38 and 40 joining the respective ends 34 and 36 of said cut off tubing 32 within the respective sockets 24 and 28. It is apparent that the tubing may be cut off quickly with a saw on the job and solder rapidly inserted with the usual blow torch now present on almost every type of plumbing job.

It is apparent that I have provided a novel type of ring pipe hanger with the advantages explained above.

It is understood that my invention is not limited to the specific embodiment shown and that various deviations may be made therefrom without departing from the spirit and scope of the appended claim.

What I claim is:

In a pipe hanger, a pair of elements each having a cylindrical socket portion and a pair of anchoring members at the base end of said socket and extending laterally thereof at diametrically opposite positions, each of said elements including its socket portion being constructed out of a single piece of metal tubing split diametrically inwardly of one end thereof for a portion of its length and bent laterally outwardly into the laterally extended anchoring portions at the base of the respective socket portion, and a metal tube connecting said elements and having its respective ends inserted within the respective sockets of said elements and fixedly secured therein.

CHESTER H. KIRK, Jr.

REFERENCES CITED

The following references are of record in the file of this patent:

UNITED STATES PATENTS

| Number | Name | Date |
|---|---|---|
| 802,087 | Robinson et al. | Oct. 17, 1905 |
| 978,912 | Mack | Dec. 20, 1910 |
| 1,025,243 | Carpenter et al. | May 7, 1912 |
| 1,801,171 | Mueller et al. | Apr. 14, 1931 |
| 1,819,754 | Mott | Aug. 18, 1931 |
| 2,224,145 | Dugan et al. | Dec. 10, 1940 |
| 2,399,103 | Clinedinst | Apr. 23, 1946 |
| 2,444,701 | Ingham | July 6, 1948 |